United States Patent
Maxilom et al.

(10) Patent No.: US 11,032,351 B2
(45) Date of Patent: Jun. 8, 2021

(54) UPDATES AND SUPPORT CHANNEL THROUGH MOBILE

(71) Applicant: NCR Corporation, Duluth, GA (US)

(72) Inventors: Chario Bardoquillo Maxilom, Ibabao Cordova (PH); Ferdinand Salarda Acedera, Cebu (PH); Shalimar Libor Mañacap, Naga (PH)

(73) Assignee: NCR Corporation, Atlanta, GA (US)

( * ) Notice: Subject to any disclaimer, the term of this patent is extended or adjusted under 35 U.S.C. 154(b) by 123 days.

(21) Appl. No.: 16/023,043

(22) Filed: Jun. 29, 2018

(65) Prior Publication Data
US 2020/0007607 A1 Jan. 2, 2020

(51) Int. Cl.
| | |
|---|---|
| *G06F 3/00* | (2006.01) |
| *H04L 29/08* | (2006.01) |
| *H04L 29/06* | (2006.01) |
| *H04W 76/15* | (2018.01) |
| *G06F 3/01* | (2006.01) |
| *H04W 12/06* | (2021.01) |

(52) U.S. Cl.
CPC ........ *H04L 67/025* (2013.01); *H04L 63/0838* (2013.01); *H04L 63/0853* (2013.01); *H04W 76/15* (2018.02); *H04L 2463/082* (2013.01); *H04W 12/06* (2013.01)

(58) Field of Classification Search
CPC ........ G06F 8/38; G06F 16/252; G06F 16/958; G06F 21/34; G06F 8/61; G06F 8/60; G06F 3/0482; H04L 63/0838; H04L 63/0853; H04L 67/025
See application file for complete search history.

(56) References Cited

U.S. PATENT DOCUMENTS

| | | | | |
|---|---|---|---|---|
| 5,101,425 A | * | 3/1992 | Darland | H04M 3/36 379/111 |
| 6,047,320 A | * | 4/2000 | Tezuka | H04L 41/00 709/223 |
| 6,462,762 B1 | * | 10/2002 | Ku | G06F 16/168 715/853 |
| 6,934,749 B1 | * | 8/2005 | Black | G06F 1/14 709/217 |
| 6,985,912 B2 | * | 1/2006 | Mullins | G06F 12/0815 |
| 7,028,306 B2 | * | 4/2006 | Boloker | G06F 8/38 719/310 |
| 2012/0036245 A1 | * | 2/2012 | Dare | H04L 41/5041 709/223 |

(Continued)

*Primary Examiner* — Nicholas Augustine
(74) *Attorney, Agent, or Firm* — Schwegman, Lundberg & Woessner

(57) ABSTRACT

A mobile-based control of maintenance and support for an enterprise services device. A mobile application of a mobile device establishes a connection with a network portal that supplies maintenance and support for enterprise services hosted by the enterprise services device. The mobile application also establishes a connection with the enterprise services device. The mobile application presents a user-facing interfaces for controlling maintenance and support operations delivered from the network portal to the enterprises services device. The user-facing interface also provides options for authorizing and facilitating a remote connection from a portal device to the enterprise services device for performing real-time and remote maintenance and support by a service engineer associated with the network portal.

20 Claims, 4 Drawing Sheets

(56) References Cited

U.S. PATENT DOCUMENTS

| | | | | |
|---|---|---|---|---|
| 2012/0036442 A1* | 2/2012 | Dare | ............................ | G06F 8/60 |
| | | | | 715/736 |
| 2012/0036552 A1* | 2/2012 | Dare | ..................... | H04L 41/0803 |
| | | | | 726/1 |
| 2013/0246135 A1* | 9/2013 | Wang | ....................... | G07C 5/008 |
| | | | | 705/14.4 |
| 2013/0282894 A1* | 10/2013 | Barak | .................... | G06F 40/226 |
| | | | | 709/224 |
| 2013/0283146 A1* | 10/2013 | Barak | .................... | G06F 16/958 |
| | | | | 715/234 |
| 2014/0068589 A1* | 3/2014 | Barak | ...................... | G06F 9/445 |
| | | | | 717/170 |
| 2016/0092059 A1* | 3/2016 | Tu | ........................... | G06F 16/252 |
| | | | | 715/738 |
| 2016/0092499 A1* | 3/2016 | Leigh | ......................... | G06F 8/34 |
| | | | | 707/740 |

* cited by examiner

UPDATES AND SUPPORT CHANNEL THROUGH MOBILE

BACKGROUND

Many enterprises maintain their enterprise services on a server that is disconnected from the web. The software provided and running on these servers can only be supported and updated through a dedicated online portal accessed from the servers. Updates and support require direct access between the server and the portal and in many cases require physical disks to be uploaded on the server (which requires the physical presences of support staff and the server sites). Support staff associated with the software also have to physically visit the enterprise servers to perform maintenance and support on behalf of the enterprise.

By separating the servers from the web, the servers are less vulnerable to attacks and malicious activity (as is the portal). However, support and maintenance is cumbersome, inconvenient, manually intensive, untimely, and costly for the enterprises because access to the portal must be achieved while at the physical server itself by establishing a secure session with the portal.

Therefore, what is needed is improved mechanisms for updating and supporting enterprise servers and their corresponding services from their portal delivery systems.

SUMMARY

In various embodiments, methods and a system for updating and supporting enterprise services through a mobile device are presented.

According to an embodiment, a method for updating and supporting an enterprise service through a mobile device is presented. Specifically, and in one embodiment, a mobile device establishes connections with an enterprise services device and a network portal device. The mobile device provides a support and maintenance interface on a display of the mobile device to manage enterprise services hosted on the enterprise services device with updates to the enterprise services provided to the enterprise services device from the network portal device. Furthermore, the mobile device processes operations selected through the support and maintenance interface with a mobile agent of the enterprise services device and the network portal device.

DETAILED DESCRIPTION

Figure 1:
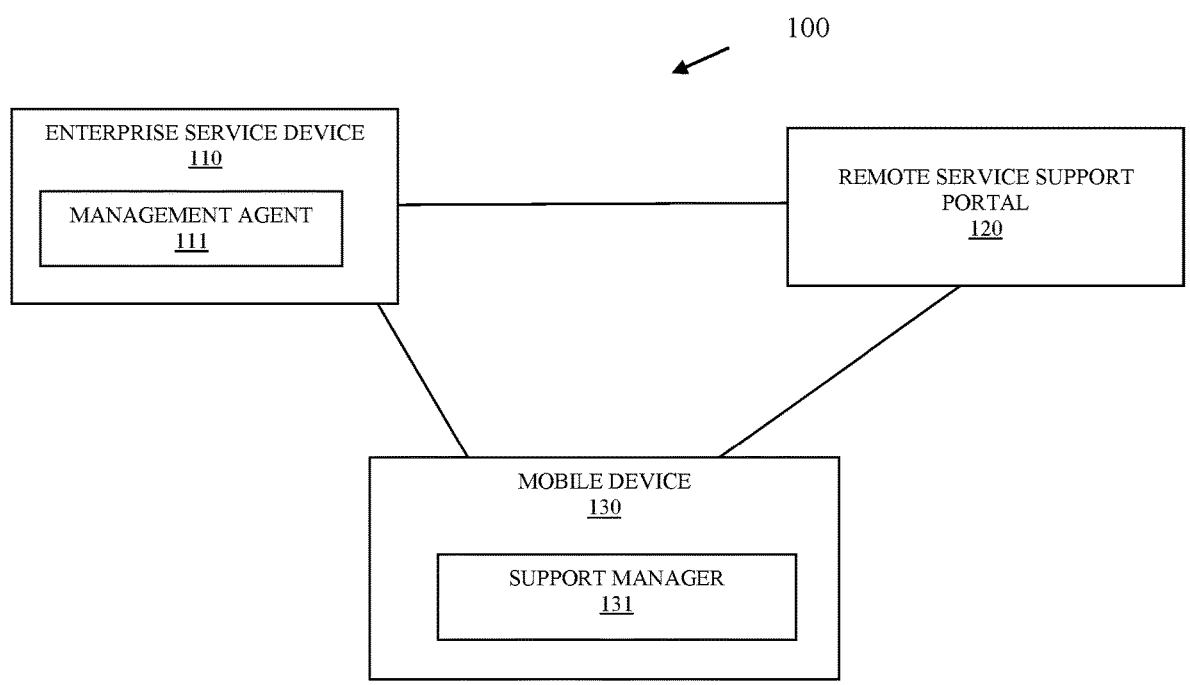
FIG. 1 is a diagram of a system for updating and supporting an enterprise service through a mobile device, according to an example embodiment.

FIG. 1 is a diagram of a system 100 for updating and supporting an enterprise service through a mobile device, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of updating and supporting an enterprise service through a mobile device, presented herein and below.

The system 100 includes enterprise services device 110 (located on enterprise servers or enterprise computing devices). The device 110 includes a novel management agent 111. The system 100 further includes a remote service support portal 120 (server or cloud server), and the system 100 includes a mobile device 130 having a novel support manager 131.

The mobile device 130 can include: phones, tablets, laptops, desktops, wearable processing devices, and the like.

The enterprise services device 110 includes a server disconnected from the web with the server provide online access to enterprise-delivered services. In an embodiment, the enterprise services device 110 is a server located at an enterprise facility and controlled and maintained by the enterprise.

The remote service support portal 120 is a third-party vender of some or all of the enterprise services. The portal is a server or a cloud-based server and provides software and support for the enterprise services.

The support manager 131 includes processing for wireless connecting from the mobile device 130 to both the enterprise services device 110 and the remote service support portal 120. In addition, the support manager 131 includes a user-facing interface that provides enterprise service support and maintenance operations to be initiated and monitored from the mobile device 130 through the user-facing interface of the support manager 131.

The support manager 131 securely connects in a communication session with the remote service support portal 120 and the management agent 111 of the enterprise services device 110. Available software patches or hotfixes for the enterprises services are provided from the report service support portal 120 upon connection by the support manager 131 to the portal 120.

The user-facing interface of the support manager 131 allows for sliding bar touchscreen interface option for connecting to the portal 120 or disconnecting from the portal 120. The user-facing interface of the support manager 131 provides a sliding bar touchscreen interface for granting a specific service technician associated with the portal 120 to remotely and directly connect to the enterprise services device 110 for performing remote maintenance and support operations on the enterprise services hosted by the enterprise services device 110.

In an embodiment, the user-facing interface of the support manager 131 provides a split screen depiction on a display of the mobile device 130 for viewing the available patches and hot fixes for specific enterprises services on one side of the split screen and the sliding bar touchscreen interface options for connecting to the portal and for granting remote technician access to device 110 on another side of the split screen.

Any selected patches, upgrades, hotfixes selected from the user-facing interface of the support manager 131 are communicated to the management agent 111 over the wireless connection between the mobile device 130 and the enterprise services device 110. The user-facing interface then permits scheduling or immediate installation of the selected support operation through communication with the management agent 111.

In an embodiment, the upgrades, hotfixes, and/or patches can be scheduled for download from the portal 120 to the enterprise services device 110 through the user-facing interface of the support manager 131. Downloads of the software for the enterprises services can be scheduled or immediately processed. Furthermore, the request for the download can be made through interaction with the agent 111 or though interaction with the portal 120 from the support manager 131.

The support manager 131 is provided as a mobile application on the mobile device and supports operations through interaction with the agent 111 and the portal 120 for at least the following: 1) patch and hotfix over an auto-update support channel of communication (the support manager 131 upon connection automatically detects and manages any available application updates for the enterprise services of the enterprise services device 110 and the support manager controls download and deployment of installers for such updates on the enterprise services device 110, such that installation of updates to the device 110 require no human intervention and presence at the device 110); and 2) online support access channel of communication, once enabled this allows the mobile device 130 to connect to the portal 120 and detect available updates to the enterprise services of device 110, and this allows management of allowing remote service personnel of the portal 120 to remotely access the live online enterprise services devices (here an option within the support manager also permits dynamically and in real time cutting any live remote support session off through options available in the user-facing interface of the support manager 131. So, complete and full maintenance and support control is provided through the support manager 131, the management agent 111, and the portal 120 via the user-facing interface of the support manager 131 on the mobile device 130.

In an embodiment, the wireless connection between the mobile device 130 and the enterprise services device 110 uses multifactor authentication managed by the agent 111; the first factor includes a user-provided identifier and password and the second factor includes a one-time only randomly generated code by the agent 111 that is delivered to the mobile device outside of the channel of communication between the agent 111 and the support manager 131 (out-of-band communication), such as though a text message to the mobile device 130 (the mobile device number pre-registered with the agent 111). The user/operator of the mobile device 130 then enters the code received through the out-of-band text message into a code enter screen rendered within the support manager 131. The agent 111 validates the entered codes as a second form of authentication.

In an similar manner, the wireless connection between the mobile device 130 and the portal 120 can uses multifactor authentication managed by an application on the portal 120 with the first factor being an identifier and password of the operator of the mobile device 130 and the second factor being the one-time-only code sent through an out-of-band text message from the application of the portal 120 to the mobile device 130.

In an embodiment, the support manager 131 also provides for an out-of-band authentication of any support personnel's device requesting online access to the enterprise services device 110. That is, the support manager 131 can interact with the agent 111 to identify a device identifier for the support personnel and the agent 111 sends the randomly generated code to that device that when entered into a login screen associated with the agent 111 authenticates the support personnel associated with the portal 120 for online access to the enterprise services devices 110. Here, the support manager 131 sends a link for logging into the agent 111 to the device or email of the support personnel, the link may or may not include an identifier and password for use by the service personnel as a first form of authentication. The support manager 131 then sends a notice of the remote access request from the support personnel along with a device identifier or an email of the support personnel to the agent 111. When the support personnel activates the link provided by the support manager 131 a connection between the support personnel's device and the enterprise services device 110 is established and the agent sends the random remote code back to the support personnel and displays a code-input screen into which the support personnel enters the received code. If entered correctly, the agent 111 provides access to the online enterprise services device 110.

The initial access rights can be set and defined for the support personnel's session with the device 110 by the operator of the mobile device 130 through the user-facing interface of the support manager 131. That is, the user-operator can grant access rights with varying degrees of permissions. For example, access can be given for viewing and updating or changing a specific enterprise service available on the device 110. The access can also be restricted by time or a time to live attribute set by the operator of the mobile device 130, such as one hour, one day, etc. The permissions and any time-to-live attribute can be communicated from the support manager 131 to the agent during initial registration of the support personnel for online remote access to device 110. The agent 111 then enforces the time-to-live attribute and the access permissions during the session with the service personnel.

As stated before, the operator of the mobile device 130 can also use the user-facing interface of the support manager 131 to dynamically end or kill any granted online session between the service personnel of the portal 120 and the device 120. This is done through communication from the support manager 131 to the agent 111 to immediately kill or end an existing remote support session.

In an embodiment, the user-facing interface of the support manager 131 permits the operator to view activities of the support personnel during a remote support session between the device of the support personnel and the enterprise services device 110. Here, commands executed are tracked during the session by the agent 111 and sent in real time back to the support manager 131 for presentation within the user-facing interface of the support manager 131. In this way, the operator of the mobile device 130 maintains complete control and can monitor any granted online remote support session between a device of the support personnel of the portal 120 and the enterprise services device 110.

These and other embodiments are now discussed with reference to the FIGS. 2-4.

Figure 2:
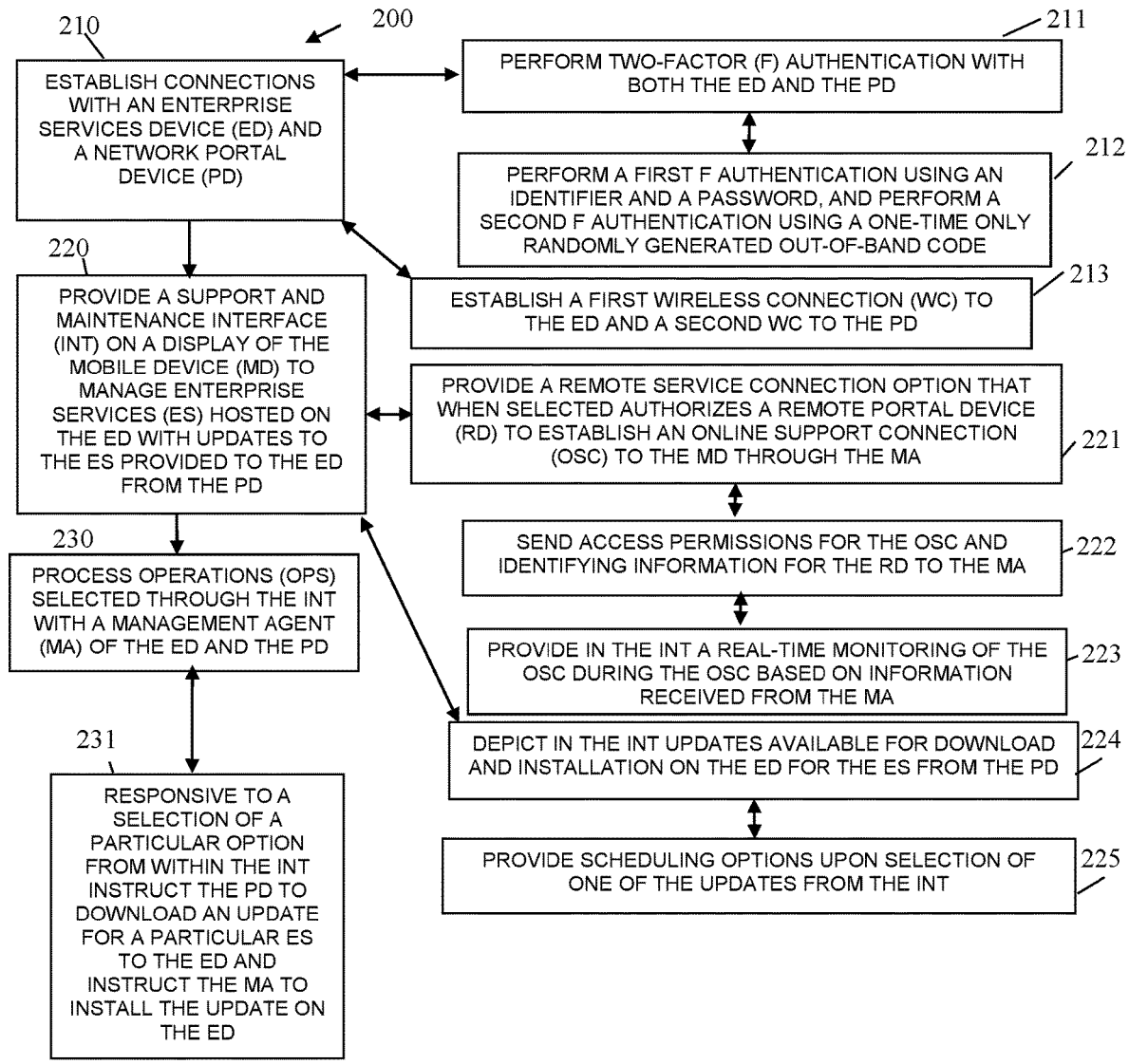
FIG. 2 is a diagram of a method for updating and supporting an enterprise service through a mobile device, according to an example embodiment.

FIG. 2 is a diagram of a method 200 for updating and supporting enterprise services, according to an example embodiment. The software module(s) that implements the method 200 is referred to as a "remote mobile support manager." The remote mobile support manager is implemented as executable instructions programmed and residing within memory and/or a non-transitory computer-readable (processor-readable) storage medium and executed by one or more processors of a device. The processor(s) of the device that executes the remote mobile support manager are specifically configured and programmed to process the remote mobile support manager. The remote mobile support manager has access to one or more network connections during its processing. The network connections can be wired, wireless, or a combination of wired and wireless.

In an embodiment, the device that executes the remote mobile support manager is a mobile device. In an embodiment the mobile device is the mobile device 130. In an embodiment, the mobile device is one of: a tablet, a phone, a laptop, and a wearable processing device.

In an embodiment, the remote mobile support manager is the support manager 131.

At 210, the remote mobile support manager establishes two connections with an enterprise services device (ED) and a network portal device (PD).

In an embodiment, at 211, the remote mobile support manager performs two-factor authentication with both the ED and the PD.

In an embodiment of 211 and at 212, the remote mobile support manager performs a first factor authentication using an identifier and a password combination, and the remote mobile support manager performs a second factor authentication using a one-time only randomly generated out-of-band code.

In an embodiment, at 213, the remote mobile support manager establishes a first wireless connection to the ED and a second wireless connection to the PD.

At 220, the remote mobile support manager provides a support and maintenance interface on a display of the mobile device to manage enterprise services hosted on the ED with updates to the enterprise services being provided to the ED from the PD.

In an embodiment, at 221, the remote mobile support manager provides a remote service connection option that when selected authorizes a remote portal device (RD) to establish an online support connection to the mobile device through the management agent of the ED.

In an embodiment of 221, at 222, the remote mobile support manager sends access permissions for the online service connection and identifying information for the RD to the management agent.

In an embodiment of 222, at 223, the remote mobile support manager provides in the support and maintenance interface a real-time monitoring of the online service connection based on information provided from the management agent of the ED.

In an embodiment, at 224, the remote mobile support manager depicts in the support and maintenance interface updates available for download and installation on the Ed for the enterprise services from the PD.

In an embodiment of 224, at 225, the remote mobile support manager provides scheduling options upon selection of one of the updates from the support and maintenance interface.

At 230, the remote mobile support manager processes operations selected through the support and maintenance interface with the management agent of the ED and with the PD. In an embodiment, the management agent is the management agent 111.

In an embodiment, at 231, the remote mobile support manager responsive to a selection of a particular option from within the support and maintenance interface instructs the PD to download an update for a particular enterprise service and further instructs the management agent to install the update on the ED.

Figure 3:
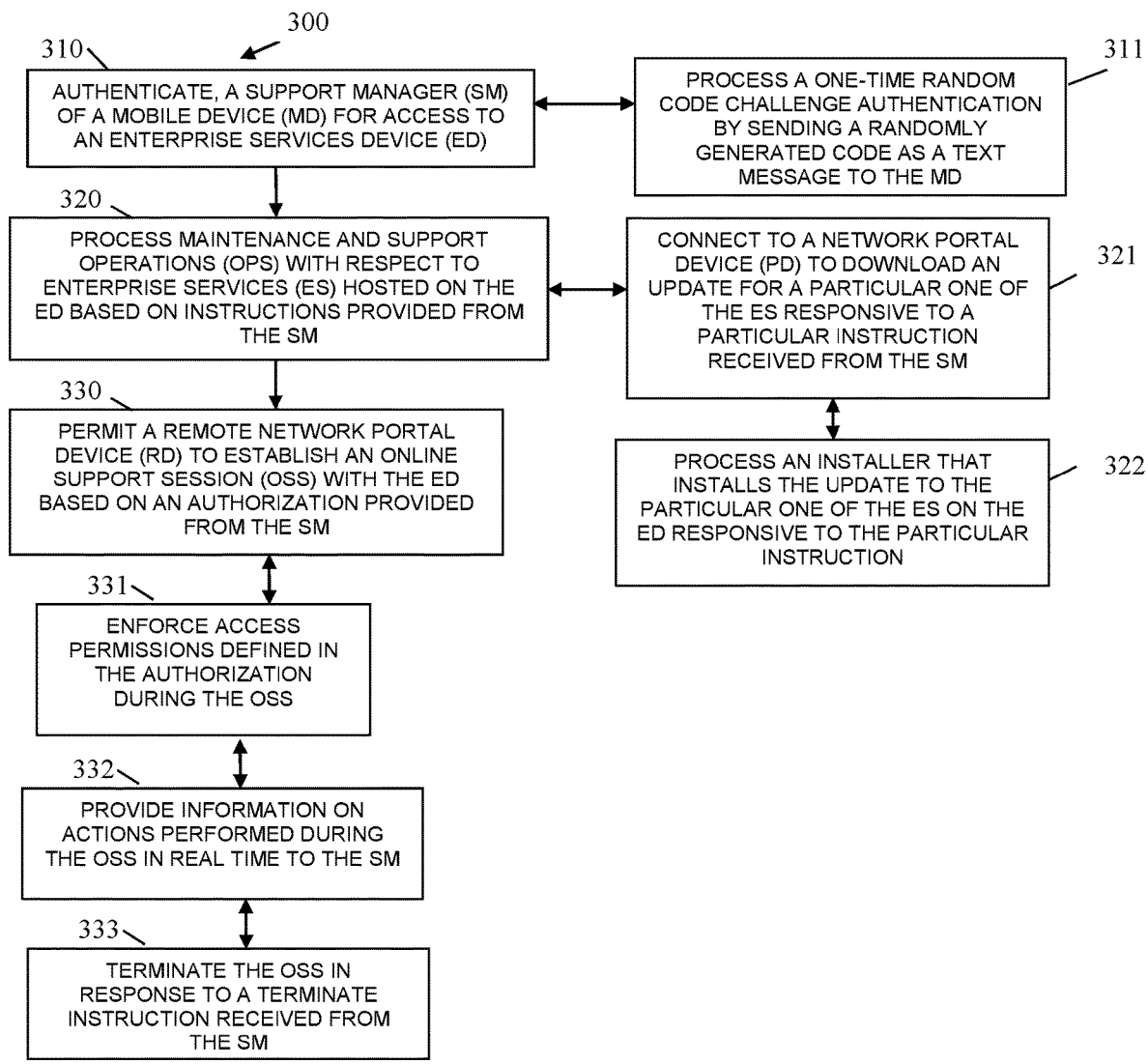
FIG. 3 is a diagram of another method for updating and supporting an enterprise service through a mobile device, according to an example embodiment.

FIG. 3 is a diagram of another method 300 for updating and supporting enterprise services, according to an example embodiment. The software module(s) that implements the method 300 is referred to as a "management agent." The management agent is implemented as executable instructions programmed and residing within memory and/or a non-transitory computer-readable (processor-readable) storage medium and executed by one or more processors of a device. The processors that execute the management agent are specifically configured and programmed to process the management agent. The management agent has access to one or more network connections during its processing. The network connections can be wired, wireless, or a combination of wired and wireless.

In an embodiment, the device that executes the management agent is a server. In an embodiment, the server is the enterprise services device 110. In an embodiment, the device that executes the management agent 111 is disconnected from the web and makes connections to devices through dedicated established peer-to-peer (P2P) connections, Local Area Network (LAN) connections, and dedicated private Wide-Area Network (WAN) connections.

In an embodiment, the management agent is the management agent 111.

The management agent presents processing of the teachings presented herein performed on an enterprise services device 110. The management agent interacts with the method 200 (which processes as the support manager 131 on a mobile device 130).

At 310, the management agent authenticates a support manager that executes on a mobile device for access to an enterprise services device (the enterprise services device executing the management agent). In an embodiment, the support manager is the support manager 131 and/or the method 200.

In an embodiment, at 311, the management agent processes a one-time random code challenge authentication by sending a randomly generated code as a text message to the mobile device.

At 320, the management agent processes maintenance and support operations with respect to enterprise services hosted on the enterprise services device based on instructions provided from the support manager.

In an embodiment, at 321, the management agent connects to a network portal device to download an update for a particular one of the enterprise services responsive to a particular instruction received from the support manager.

In an embodiment of 321, at 322, the management agent processes an installer that installs the update to the particular one of the enterprises services on the enterprise services device responsive to the particular instructions.

In an embodiment, at 330, the management agent permits a remote network portal device to establish an online support session with the enterprise services device based on an authorization provided from the support manager.

In an embodiment of 330, at 331, the management agent enforces access permissions defined in the authorization during the online support session.

In an embodiment of 331, at 332, the management agent provides information on actions performed during the online support session in real time to the support manager.

In an embodiment of 332, at 333, the management agent terminates the online support session in response to a terminate instruction received from the support manager.

Figure 4:
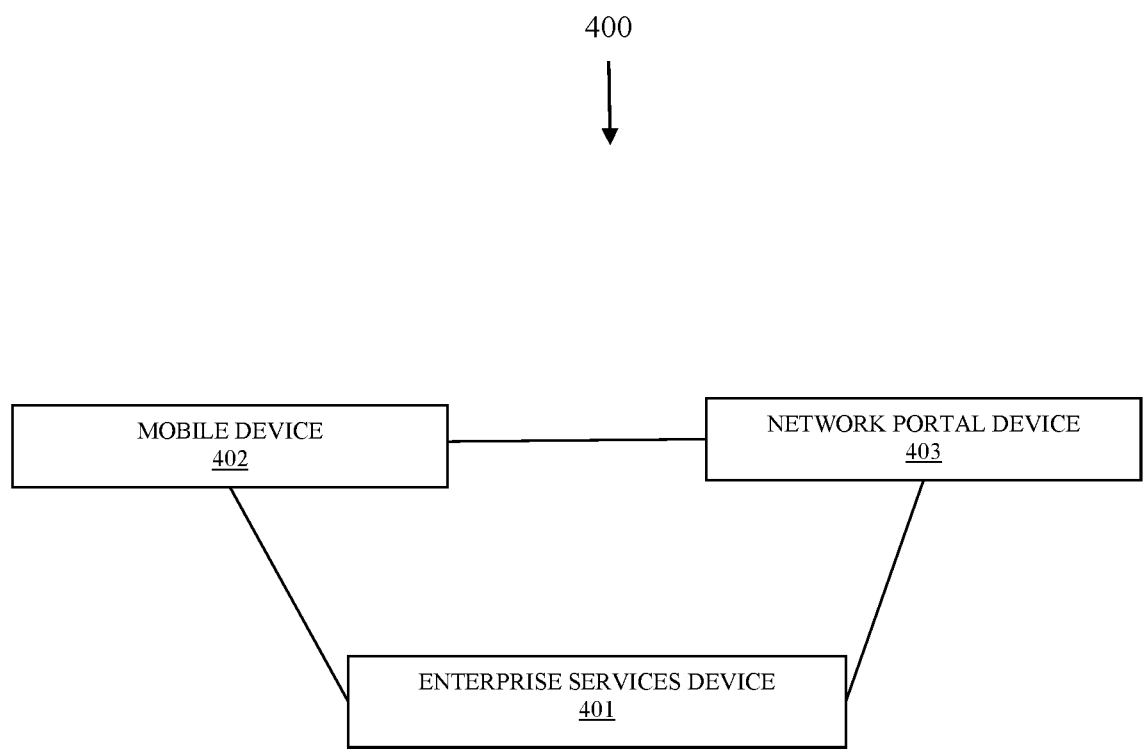
FIG. 4 is a diagram of a system for updating and supporting an enterprise service through a mobile device, according to an example embodiment.

FIG. 4 is a diagram of a system 400 for updating and supporting enterprise services, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes an enterprise services device 401, a mobile device 402, and a network-portal device 403.

In an embodiment, processing performed by the enterprise services device 401 is all of or some combination of the processing described above for the management agent 111 and/or the method 300.

In an embodiment, the processing performed by the mobile device 402 is all of or some combination of the processing described above for the support manager 131 and/the method 200.

In an embodiment, the enterprises services device 401 is the enterprise services device 110, the mobile device 402 is the mobile device 130, and the network-portal device 403 is the portal 120.

In an embodiment, the mobile device 402 is one of: a tablet, a phone, a laptop, and a wearable processing device.

In an embodiment, the enterprises services device 401 is a server that is disconnected from the web and permits only dedicated P2P connections, LAN connections, or closed and private WAN connections for network communications with other devices.

The enterprise services device 401 hosts enterprise services that execute on one or more hardware processes of the enterprise services device 401.

In an embodiment, the network-based portal device 403 is a server or a cloud-based server.

The enterprises services device 401 includes at least one hardware processor that is configured to execute executable instructions from a non-transitory computer-readable storage medium, the executable instructions representing the management agent 111 and/or the method 300.

The mobile device 402 includes at least one hardware processor that is configured to execute executable instructions from a non-transitory computer-readable storage medium, the executable instructions representing the support manager 131 and/or the method 200.

The network-portal device 403 includes at least one hardware processor that is configured to execute executable instructions from a non-transitory computer-readable storage medium, the executable instructions representing the interactions between the management agent 111 and the portal 120, and the interactions between the support manager 131 and the portal 120 (as described above with the FIGS. 1-3).

The enterprise services device 401 is configured to: i) permit a connection to the mobile device 402; ii) process maintenance and support operations requested by the mobile device 402 over the connection, and iii) permit a second connection to the network portal device 403 in performance of at least one of the maintenance and support operations.

The mobile device 402 is configured to: i) establish the connection with the enterprise services device 401, ii) establish a third connection to the network portal device 403, and iii) receive the maintenance and support operations through a user-facing interface of the mobile device 402.

The network-portal device 403 is configured to: i) permit the second and third connections, ii) provided available updates to the enterprises services to the mobile device 402, and iii) download selected updates identified from the user-facing interface of the mobile device 402 to the enterprise services device 401 over the second connection.

In an embodiment, the enterprise services device 401 is configured to host the enterprise services without a web-based connection over a network, such as through a Local Area Network (LAN) connection or a closed and dedicated Wide Area Network (WAN) connection or P2P connections.

In an embodiment, the enterprise services are internally accessible retail services that a retailer uses to manage customers, promotions, inventory, sales, expenses, and employees.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    establishing, by a mobile device, connections with an enterprise services device and a network portal device;
    providing, by the mobile device, a support and maintenance interface on a display of the mobile device to manage enterprise services hosted on the enterprise services device with updates to the enterprise services provided to the enterprise services device from the network portal device;
    identifying, by the mobile device through the support and maintenance interface, at least one support operation that is needed by the enterprise services device and that is available and provided by the network portal device, wherein identifying further includes rendering a split screen on the display of the mobile device comprising a first screen on one side of the display that comprises available patches and fixes for each enterprise service and a second screen on another side of the display that comprises touchscreen interface options for granting a remote technician access to the enterprise services device and receiving the at least one support operation and the corresponding enterprise service as a selection made by a user who operates the mobile device and who is interacting with the support and maintenance interface;

processing, by the mobile device, operations selected through the support and maintenance interface with a management agent of the enterprise services device and the network portal device;

presenting, by the mobile device, real-time viewing of activities associated with the operations as the operations are processed on the enterprise services device;

controlling, by the mobile device through the support and maintenance interface, the processing of the support operation on the enterprise services device as provided by the network portal to the enterprise services device, wherein controlling further includes dynamically authorizing support personnel associated with the network portal device with remote access to the enterprise services device in a remote support session with the enterprise services device based on an authorization provided by the user through the second screen of the split screen for the support and maintenance interface.

2. The method of claim 1, wherein establishing further includes performing two-factor authentication with both the enterprise services device and the network portal device.

3. The method of claim 2, wherein performing further includes performing a first factor authentication using an identifier and a password, and performing a second factor authentication using a one-time only randomly generated out-of-band code.

4. The method of claim 1, wherein establishing further includes establishing a first wireless connection to the enterprise services device and a second wireless connection to the network portal device.

5. The method of claim 1, wherein providing further includes providing a remote service connection option that when selected authorizes a remote portal device to establish an online support connection to the mobile device through the management agent.

6. The method of claim 5, wherein providing further includes sending access permissions for the online support connection and identifying information for the remote portal device to the management agent.

7. The method of claim 6, wherein sending further includes providing in the support and maintenance interface real-time monitoring of the online support connection during the online support connection based on information received from the management agent.

8. The method of claim 1, wherein providing further includes depicting in the support and maintenance interface updates available for download and installation on the enterprise services device for the enterprise services from the network portal device.

9. The method of claim 8, wherein depicting further includes providing scheduling options upon selection of one of the updates from the support and maintenance interface.

10. The method of claim 1, wherein processing further includes responsive to a selection of a particular option from within the support and maintenance interface instructing the network portal device to download an update for a particular enterprise service to the enterprise services device and instructing the management agent to install the update on the enterprise services device.

11. A method, comprising:
authenticating, by an enterprise services device, a support manager of a mobile device for access to the enterprise services device;
processing, by the enterprise services device, maintenance and support operations with respect to enterprise services hosted on the enterprise services device based on instructions provided from the support manager;
receiving, by the enterprise services device, a support operation from the support manager of the mobile device, the support operation needed by the enterprise services device and available through a remote network portal device, wherein receiving further includes receiving the support operation from a user who operates the mobile device and who interacts with a support and maintenance interface of the support manager, wherein receiving the support operation further includes receiving the support operation as a selection made by the user within a split screen on a display of the mobile device, wherein the spit screen comprises a first screen on one side of the display that comprises available patches and fixes for each enterprise service and a second screen on another side of the display that comprises touchscreen interface options for granting a remote technician access to the enterprise services device;
interacting, by the enterprise services device, with the remote network portal device and processing the support operation based on a support instruction received from the support manager;
permitting, by the enterprise services device, the support manager to control processing of the maintenance and support operations on the enterprise services device, wherein permitting further includes dynamically authorizing support personnel associated with the remote network portal device with remote access in a remote support session with the enterprise services device based on an authorization provided by the support manager and as provided by the user through the second screen of the split screen of the support and maintenance interface on the mobile device; and
sending, by the enterprise services device, activities associated with the maintenance and support operations to the support manager in real time.

12. The method of claim 11 further comprising, permitting, by the enterprise services device, the remote network portal device to establish an online support session with the enterprise services device based on the authorization provided from the support manager.

13. The method of claim 12, wherein permitting further includes enforcing access permissions defined in the authorization during the online support session.

14. The method of claim 13, wherein enforcing further includes providing information on actions performed during the online support session in real time to the support manager.

15. The method of claim 14, wherein enforcing further includes terminating the online support session in response to a terminate instruction received from the support manager.

16. The method of claim 11, wherein authenticating further includes processing a one-time random code challenge authentication by sending a randomly generated code as a text message to the mobile device.

17. The method of claim 11, wherein processing further includes connecting to a remote network portal device to download an update for a particular one of the enterprise services responsive to a particular instruction received from the support manager.

18. The method of claim 11, wherein connecting further includes processing an installer that installs the update to the particular one of the enterprises services on the enterprise services device responsive to the particular instruction.

19. A system, comprising:
an enterprise services device comprising enterprise services executing on one or more hardware processors of the enterprise services device;
a mobile device; and
a network portal device;
wherein the enterprise services device is configured to: i) permit a connection to the mobile device; ii) process maintenance and support operations requested by the mobile device over the connection, wherein the maintenance and support operations are identified by the network portal device and controlled on the enterprise services device by the mobile device over the connection, iii) permit a second connection to the network portal device in performance of at least one of the maintenance and support operations, iv) permit a remote-support connection from the network portal device initiated by support personnel having remote access to the network portal device in a remote support session with the enterprise services device as authorized by the mobile device, and v) send activities associated with the maintenance and support operations as the maintenance and support operations are processed on the enterprise services device;
wherein the mobile device is configured to: i) establish the connection with the enterprise services device, ii) establish a third connection to the network portal device, iii) receive the maintenance and support operations through a user-facing interface of the mobile device from the network portal device and control processing of the maintenance and support operations on the enterprise services device through the user-facing interface, wherein the user-facing interface provides a split screen on a display of the mobile device to receive selections from a user for the maintenance and support operations and the corresponding enterprise service from a first screen of the split screen and to receive authorizations from the user for granting remote access to a remote technician from a second screen of the split screen, iv) dynamically authorize the support personnel remote access to the network portal device in the remote support session with the enterprise services device based on the authorizations provided by the user through the second screen of the user-facing interface, and v) present real-time viewing of the activities reported for the enterprise services device on the mobile device;
wherein the network portal device is configured to: i) permit the second connection, remote support connection and third connections in real time to the network portal device, ii) provided available updates to the enterprises services to the mobile device, and iii) download selected updates identified from the user-facing interface of the mobile device to the enterprise services device over the second connection.

20. The system of claim 19, wherein the enterprise services device hosts the enterprise services without a web-based connection over a network.

\* \* \* \* \*